(12) United States Patent
Liang

(10) Patent No.: US 8,405,643 B2
(45) Date of Patent: Mar. 26, 2013

(54) STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 278 days.

(21) Appl. No.: 12/840,448

(22) Filed: Jul. 21, 2010

(65) Prior Publication Data

US 2011/0234546 A1    Sep. 29, 2011

(30) Foreign Application Priority Data

Mar. 25, 2010 (CN) .......................... 2010 1 0132368

(51) Int. Cl.
*G06F 3/033* (2006.01)
*B43K 7/12* (2006.01)
*B41B 1/00* (2006.01)

(52) U.S. Cl. ............................ 345/179; 401/117; 81/9.2
(58) Field of Classification Search .................. 345/179; 81/9.2
See application file for complete search history.

(56) References Cited

U.S. PATENT DOCUMENTS

| | | | | |
|---|---|---|---|---|
| 2,502,923 A | * | 4/1950 | Burgoyne | 169/30 |
| 2,518,128 A | * | 8/1950 | Dufilho | 33/809 |
| 2,919,941 A | * | 1/1960 | Bohlman et al. | 403/18 |
| 5,889,512 A | * | 3/1999 | Moller et al. | 345/179 |
| 6,066,811 A | * | 5/2000 | Heilman, III | 178/18.01 |
| 6,315,012 B1 | * | 11/2001 | Fried et al. | 141/311 R |
| 6,344,848 B1 | * | 2/2002 | Rowe et al. | 345/179 |
| 6,461,074 B2 | * | 10/2002 | Taylor | 403/378 |
| 6,616,365 B1 | * | 9/2003 | Vann | 401/117 |
| 7,431,528 B2 | * | 10/2008 | Liu | 401/258 |
| 8,284,174 B2 | * | 10/2012 | Liang | 345/179 |
| 2011/0074741 A1 | * | 3/2011 | Liang et al. | 345/179 |
| 2011/0094804 A1 | * | 4/2011 | Liang | 178/19.01 |
| 2011/0096039 A1 | * | 4/2011 | Liang | 345/179 |
| 2011/0115752 A1 | * | 5/2011 | Liang | 345/179 |
| 2011/0139518 A1 | * | 6/2011 | Liang | 178/19.01 |
| 2011/0139519 A1 | * | 6/2011 | Liang et al. | 178/19.01 |
| 2011/0155480 A1 | * | 6/2011 | Liang | 178/19.01 |
| 2011/0181554 A1 | * | 7/2011 | Liang | 345/179 |
| 2011/0181555 A1 | * | 7/2011 | Liang | 345/179 |
| 2011/0193826 A1 | * | 8/2011 | Liang | 345/179 |
| 2011/0193827 A1 | * | 8/2011 | Liang | 345/179 |
| 2011/0210948 A1 | * | 9/2011 | Liang | 345/179 |
| 2011/0221710 A1 | * | 9/2011 | Liang | 345/179 |
| 2011/0221712 A1 | * | 9/2011 | Liang | 345/179 |
| 2011/0226537 A1 | * | 9/2011 | Liang | 178/19.01 |
| 2011/0234546 A1 | * | 9/2011 | Liang | 345/179 |
| 2011/0234547 A1 | * | 9/2011 | Liang | 345/179 |
| 2011/0234548 A1 | * | 9/2011 | Liang | 345/179 |

(Continued)

*Primary Examiner* — Alexander S Beck
*Assistant Examiner* — Mihir Rayan
(74) *Attorney, Agent, or Firm* — Altis Law Group, Inc.

(57) ABSTRACT

A stylus comprises a housing, a stylus body, a latching element and a shell. The housing has a receptacle defined therethrough. The stylus body is accommodated in the receptacle and located at one end of the housing. The stylus body has two opposite arms located at one end thereof, each arm has a protrusion protruding therefrom. The latching element is mounted in the receptacle and is located at another end of the housing opposite to the stylus body. The latching element has two opposite latching cantilever and each cantilever having a rib protruding therefrom. The shell is slidably accommodated in the receptacle and has two opposite latching slots defined therein. The latching slots latch with the protrusions to hold the stylus in a retracted state, and the latching slots latch with the ribs to hold the stylus in an extended state.

7 Claims, 5 Drawing Sheets

U.S. PATENT DOCUMENTS

2011/0242061 A1* 10/2011 Liang et al. .................. 345/179
2011/0254781 A1* 10/2011 Liang et al. .................. 345/173
2011/0261022 A1* 10/2011 Liang et al. .................. 345/179
2011/0261023 A1* 10/2011 Liang et al. .................. 345/179
2011/0261024 A1* 10/2011 Liang et al. .................. 345/179
2011/0261025 A1* 10/2011 Liang et al. .................. 345/179
2011/0291999 A1* 12/2011 Liang et al. .................. 345/179

* cited by examiner

STYLUS

CROSS-REFERENCE TO RELATED APPLICATIONS

This application is related to co-pending U.S. patent applications Ser. Nos. 12/840,450 and 12/840,453, entitled "STYLUS", by SHI-XU LIANG. These application have the same assignee as the present application and have been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
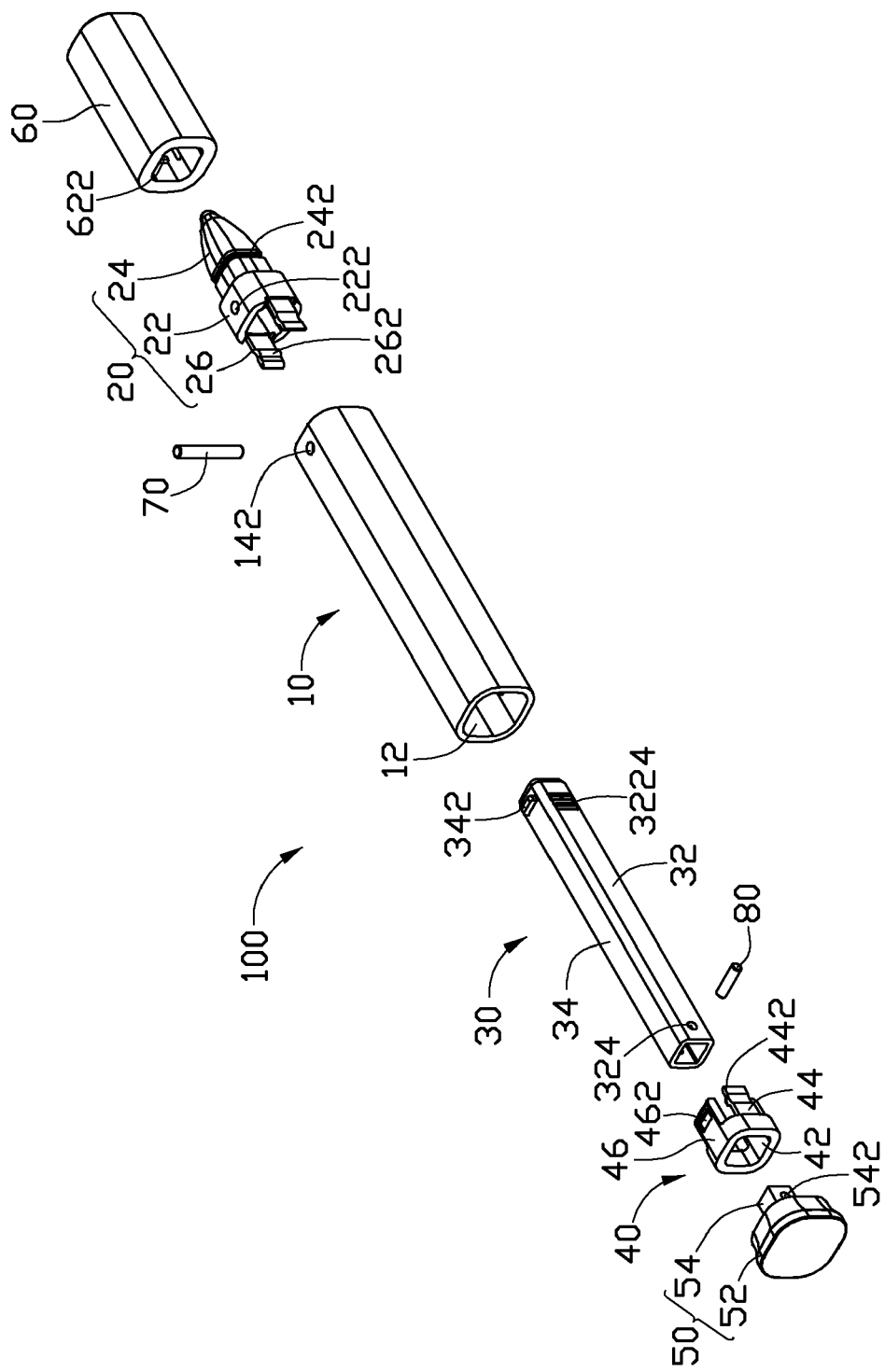
FIG. 1 is an exploded view of an exemplary stylus.
Figure 2:
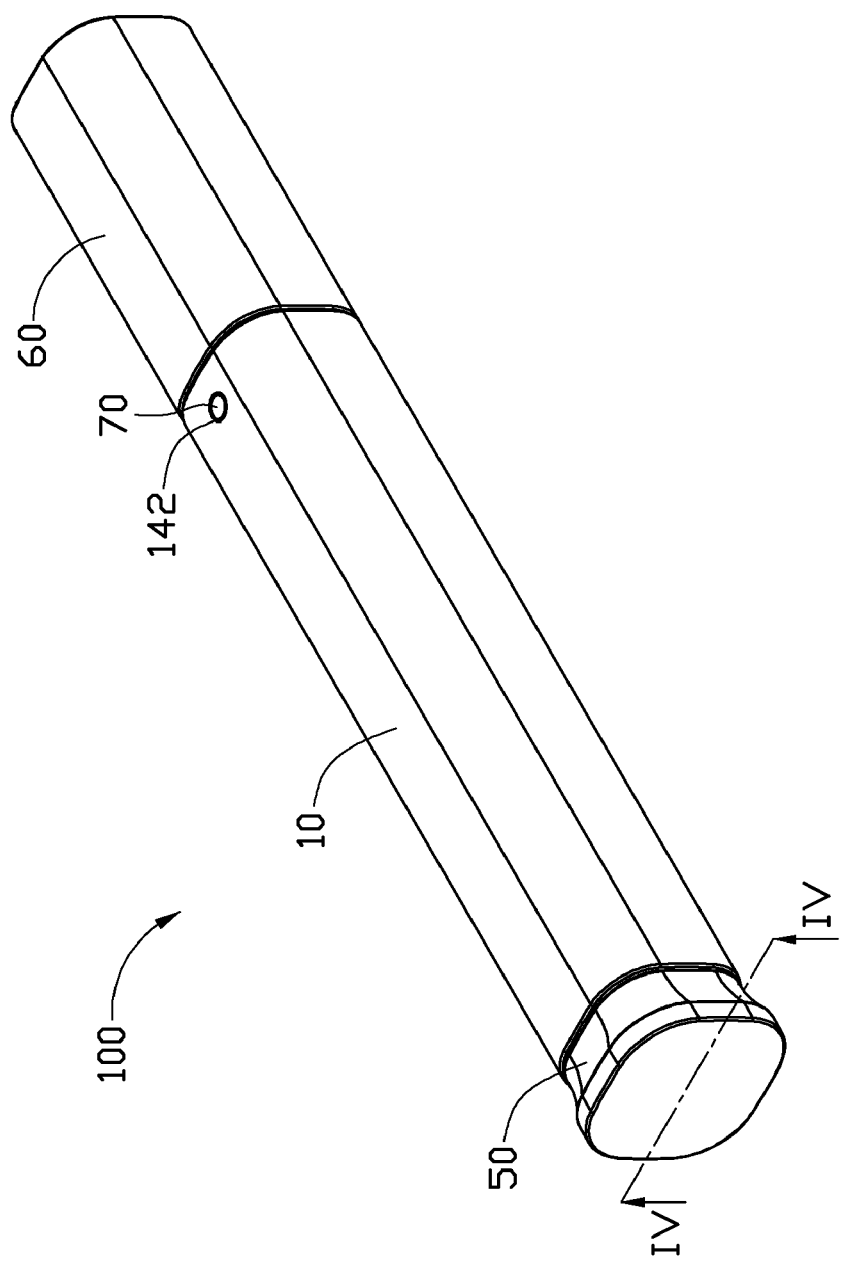
FIG. 2 is an assembled view of the stylus shown in FIG. 1.
Figure 4:
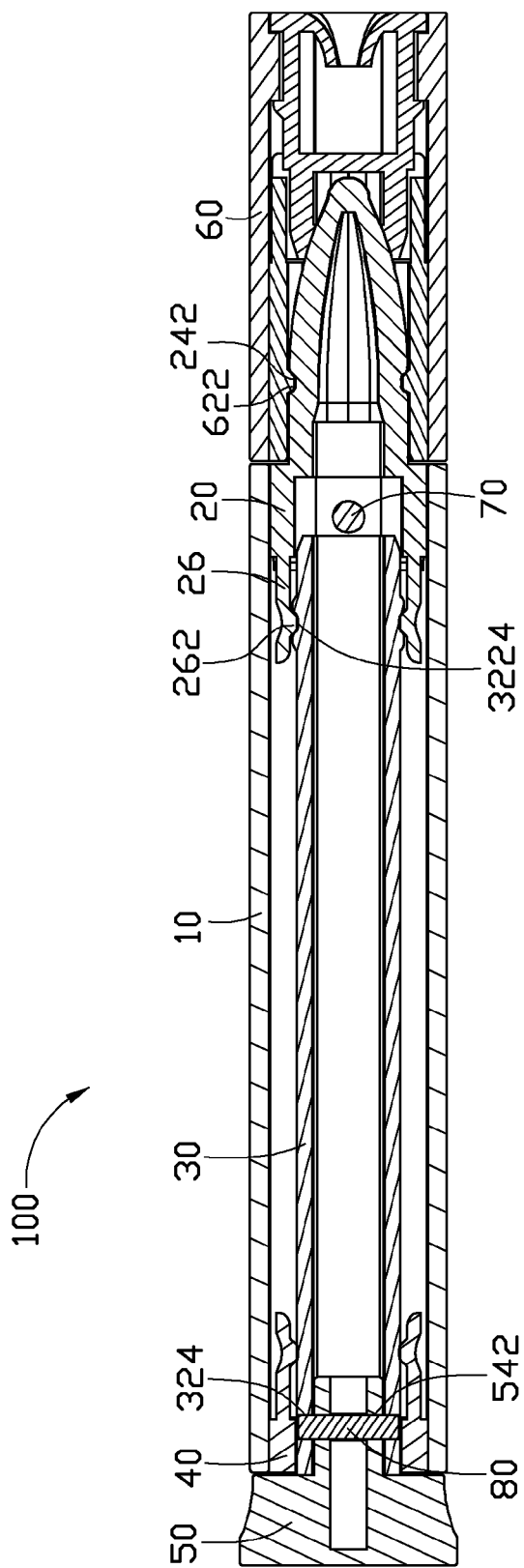
FIG. 4 is a cross-sectional view of the stylus in FIG. 2 along the line IV-IV, and wherein the stylus is in a retracted state.

Referring to FIGS. 1 and 4, the stylus 100 includes a housing 10, a stylus body 20 mounted to one end of the housing 10, a shell 30 slidably mounted in the housing 10, a latching element 40 mounted to another end of the housing 10, a cap 50 mounted to the shell 30 and a cover 60 covering and protecting the distal end of the stylus body 20. The stylus body 20 is mounted to the housing 10 by a pin 70, and the cap 50 is mounted to the shell 30 by a post 80.

Figure 3:
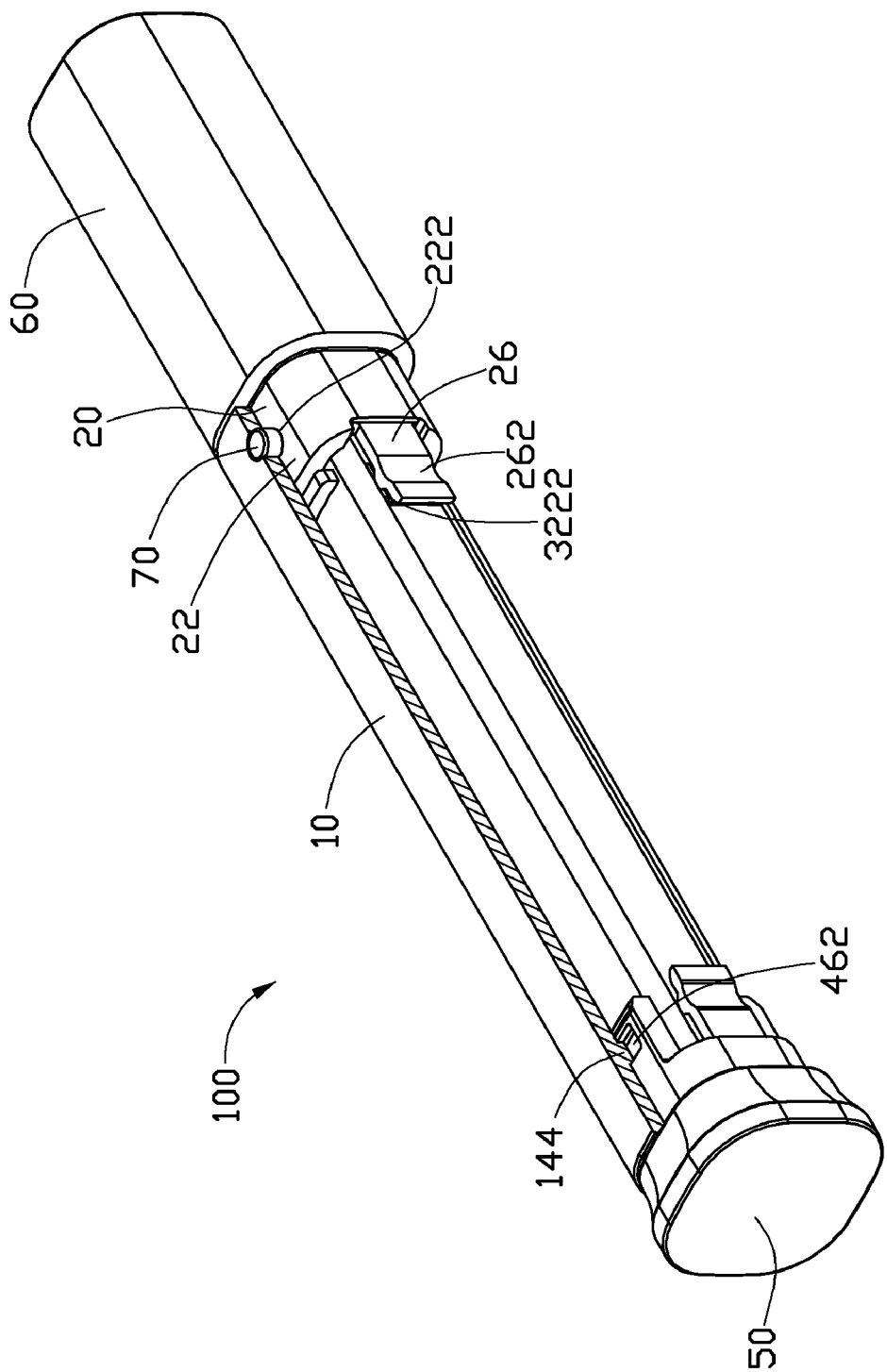
FIG. 3 is a cut-away view of the stylus shown in FIG. 2.

The housing 10 is hollow, and longitudinally defines a receptacle 12 therethrogh. The housing 10 further includes two aligned retaining holes 142 defined at one end thereof. The retaining holes 142 are for retaining the pin 70 to the housing 10. The housing 10 may further includes two aligned blocks 144 (see FIG. 3) protruding from an inner surface thereof opposite to retaining holes 142. The blocks 144 are for retaining the latching element 40 in the housing 10.

The stylus body 20 includes a hollow retaining portion 22, a head 24 protruding from one end of the retaining portion 22 and two opposite arms 26 protruding from another end of the retaining portion 22. The retaining portion 22 transversely defines an opening 222. The head 24 has a retaining slot 242 defined in a periphery thereof and near the retaining portion 22. The retaining slot 242 is for holding the cover 60 on the stylus body 20. Each arm 26 has a protrusion 262 located at one side thereof facing the other arm 26. The protrusions 262 are for holding the shell 30 in a retracted state like shown in FIG. 4.

The shell 30 is tubular and has generally the same shape as, but is slightly smaller than the receptacle 12 of the housing 10 so the shell 30 can be accommodated in the receptacle 12 and slide relative to the housing 10. The shell 30 has two opposite latching slots 3224 recessed near one end thereof for latching with the protrusions 262 so the shell 30 can be held in the retracted state shown in FIG. 4. The shell 30 further has a stopping portion 342 protruding near the latching slots 3224. When the shell 30 retracts in the retracted state shown in FIG. 4, the stopping portion 342 resists the stylus body 20 to prevent the shell 30 and the housing 10 from separating. When the shell 30 extends in an extended state shown in FIG. 5, the stopping portion 342 resists the latching element 40 to prevent the shell 30 and the housing 10 from separating. The shell 30 further defines two retaining troughs 324 near another end thereof opposite to the latching slots 3224. The retaining troughs 324 are for retaining the post 80 on the shell 30.

The latching element 40 is tubular, longitudinally defines a chamber 42. The latching element 40 is tightly fitted in the housing 10 and can not rotate relative to the housing 10. One end of the latching element 40 protrudes two opposite latching cantilevers 44 and two opposite retaining cantilevers 46. Each latching cantilever 44 has a rib 442 protruding therefrom facing the other latching cantilever 44. The ribs 442 latch with the latching slots 3224 so the shell 30 is held in the extended state shown in FIG. 5. Each retaining cantilever 46 has a retaining recess 462 recessed at one side thereof facing away from the other retaining cantilever 46. The retaining recesses 462 latch with the blocks 144 to retain the latching element 40 to the housing 10.

The cap 50 includes a board 52 and a plunger 54 protruding from one side of the board 52. The plunger 54 is inserted in the shell 30 and defines an aperture 542 therethrough. When the plunger 54 is inserted in the shell 30, the aperture 542 is aligned with the retaining troughs 324, and the post 80 is tightly fitted in the aperture 542 and the retaining troughs 324 so the cap 50 is mounted to the shell 30.

The cover 60 has two opposite securing portions 622 protruding from an inner surface of the cover 60. The securing portions 622 latch with the retaining slots 242 to hold the cover 60 on the stylus body 20.

Referring to FIG. 1-4, in assembly, the stylus body 20 is inserted in the receptacle 12, the opening 222 is aligned with the retaining holes 142. The pin 70 is inserted in the opening 222 and the retaining holes 142 to latch the stylus body 20 to the housing 10. The shell 30 is inserted in the receptacle 12. The latching element 40 is inserted in the receptacle 12 until the retaining recesses 462 latch with the blocks 144, so the latching element 40 is mounted to the housing 10, and the shell 30 passes through the chamber 42 of the latching element 40. The plunger 54 of the cap 50 passes through the chamber 42 and then enters into the shell 30, until the aperture 542 aligns with the retaining trough. The post 80 is inserted in the retaining troughs 324 and the aperture 542 to latch the cap 50 to shell 30. Finally the cover 60 is positioned on the stylus body 20 to complete assembly of the stylus 100.

Figure 5:
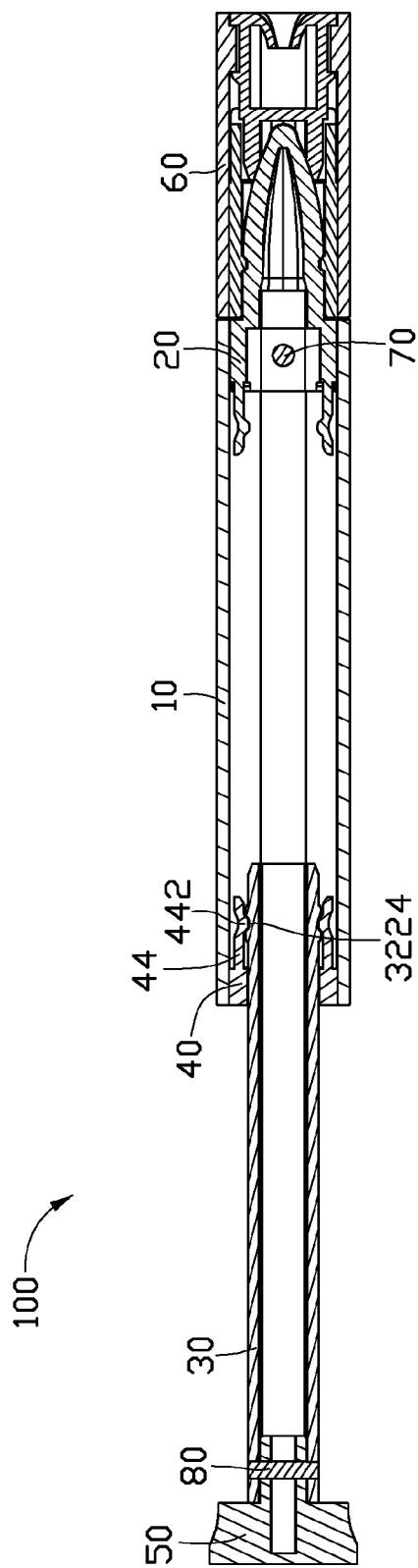
FIG. 5 is similar to FIG. 4, but showing the stylus in an extended state.

Referring to FIGS. 4 and 5, in operation, the cap 50 is pulled away from the housing 10, the protrusions 262 are slid out of the latching slots 3224, until the latching slots 3224 latch with the ribs 442. Thereby, the stylus 100 is located in the extended state and is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a housing having a receptacle defined therethrough and two opposite blocks protruding from an inner surface thereof;
a stylus body accommodated in the receptacle and located at one end of the housing, the stylus body having two opposite arms located at one end thereof and spaced from an inner surface of the receptacle, each arm having a protrusion protruding therefrom;
a latching element mounted in the receptacle and spaced apart from the stylus body, the latching element having two opposite latching cantilevers and two opposite retaining cantilevers, the latching cantilevers alternating with and spaced apart from the retaining cantilevers, each latching cantilever having a rib protruding therefrom, each retaining cantilever having a retaining recess recessed from one side thereof facing away from another retaining cantilever, the retaining recesses engaging with the blocks to latch the latching element to the housing; and
a shell slidably accommodated in the receptacle and having two opposite latching slots defined therein, the latching slots selectively latch with the protrusions to hold the stylus in a retracted state and latch with the ribs to hold the stylus in an extended state.

2. The stylus as claimed in claim 1, wherein the stylus further includes a cap including a board and a plunger extending from the board; the plunger is mounted to the shell.

3. The stylus as claimed in claim 2, wherein the stylus further comprises a post, the shell further defines two retaining troughs, the plunger defines an aperture therethrough, when the plunger is inserted in the shell, the aperture is aligned with the retaining troughs, and the post is tightly fitted in the aperture and the retaining troughs for mounting the cap to the shell.

4. The stylus as claimed in claim 1, wherein the shell further has a stopping portion protruding therefrom, the stopping portion resists the stylus body when the stylus is located in the retracted state for preventing the shell and the housing from separating.

5. The stylus as claimed in claim 4, wherein the stopping portion resists the latching element when the stylus is located in the extended state for preventing the shell and the housing from separating.

6. The stylus as claimed in claim 1, further comprising a cover, wherein the cover comprises two opposite securing portions protruding from an inner surface thereof, the stylus body further comprises a head defining a retaining slot in a periphery thereof, the securing portions are engaged in the retaining slot to hold the cover on the stylus body.

7. The stylus as claimed in claim 6, wherein the stylus further comprises a pin, the stylus body further comprises a retaining portion, the head protrudes from one end of the retaining portion, the two arms protrude from another end of the retaining portion, the retaining portion transversely defines an opening, the housing further comprises two aligned retaining holes defined at the end thereof, the pin is inserted in the opening and the retaining holes to latch the stylus body to the housing.

* * * * *